US007193960B2

(12) United States Patent
Usami et al.

(10) Patent No.: US 7,193,960 B2
(45) Date of Patent: Mar. 20, 2007

(54) METHOD OF MANUFACTURING OPTICAL RECORDING MEDIUM AND OPTICAL RECORDING MEDIUM

(75) Inventors: Mamoru Usami, Tokyo (JP); Tsuyoshi Komaki, Tokyo (JP); Kenji Yoneyama, Tokyo (JP)

(73) Assignee: TDK Corporation, Tokyo (JP)

( * ) Notice: Subject to any disclaimer, the term of this patent is extended or adjusted under 35 U.S.C. 154(b) by 514 days.

(21) Appl. No.: 10/488,103

(22) PCT Filed: Aug. 26, 2002

(86) PCT No.: PCT/JP02/08589

§ 371 (c)(1),
(2), (4) Date: Mar. 9, 2004

(87) PCT Pub. No.: WO03/025925

PCT Pub. Date: Mar. 27, 2003

(65) Prior Publication Data

US 2004/0233830 A1    Nov. 25, 2004

(30) Foreign Application Priority Data

Sep. 13, 2001 (JP) .............................. 2001-278816

(51) Int. Cl.
*G11B 7/24* (2006.01)
(52) U.S. Cl. .................. 369/275.4; 369/288; 369/286; 428/64.4
(58) Field of Classification Search ............. 369/275.1, 369/275.3, 275.4, 275.5, 288, 280, 283, 284, 369/286; 428/64.4, 64.5; 430/270.12
See application file for complete search history.

(56) References Cited

U.S. PATENT DOCUMENTS 5,340,698 A * 8/1994 Hirata et al. ........... 430/270.12

FOREIGN PATENT DOCUMENTS

JP          61-50231          3/1986

(Continued)

OTHER PUBLICATIONS

Kazuhiro Hayashi, et al., "New Replication Process Using Function-assigned Resins for Dual-layered Disk with 0.1mm-thick Cover Layer", ISOM2001 Technical Digest, pp. 312-313 2001.

*Primary Examiner*—Ali Neyzari
(74) *Attorney, Agent, or Firm*—Oblon, Spivak, McClelland, Maier & Neustadt, P.C.

(57) ABSTRACT

The present invention provides a method of manufacturing an optical recording medium having two recording layers on a supporting substrate and an optical recording medium obtained according to the method. A method of manufacturing an optical recording medium including the steps of: (A) providing a radiation-curable resin layer backed with a lining sheet 12 on a stamper 11 for the formation of information pits and/or grooves for the first recording layer, irradiating the resin layer with radiation to cure the resin layer, and removing the stamper 11, thereby to form the light transmitting layer 6 supported by the lining sheet 12; (B) forming the first recording layer 5 on the light transmitting layer 6; (C) forming the second recording layer 3 on the supporting substrate 2 with information pits and/or grooves for the second recording layer formed; (D) laminating the lining sheet 12 and the supporting substrate 2 via the space layer 4 so that the first recording layer 5 and the second recording layer 3 are located inside; and (E) removing the lining sheet 12.

40 Claims, 4 Drawing Sheets

FOREIGN PATENT DOCUMENTS

| | | |
|---|---|---|
| JP | 2-223031 | 9/1990 |
| JP | 9-161318 | 6/1997 |
| JP | 11-120632 | 4/1999 |
| JP | 2000-11453 | 1/2000 |
| JP | 2000-36130 | 2/2000 |
| JP | 2000-251335 | 9/2000 |
| JP | 2001-43569 | 2/2001 |
| JP | 2002-163847 | 6/2002 |
| JP | 2002-175646 | 6/2002 |

* cited by examiner

METHOD OF MANUFACTURING OPTICAL RECORDING MEDIUM AND OPTICAL RECORDING MEDIUM

TECHNICAL FIELD

The invention relates to a method of manufacturing an optical recording medium and an optical recording medium, and more specifically, to a method of manufacturing an optical recording medium having two recording layers on a supporting substrate and an optical recording medium obtained by the method.

BACKGROUND ART

In late years, there has been a need for an optical recording medium capable of affording still higher recoding density for processing a huge amount of information such as dynamic picture image information, and the research and development have been actively conducted for achieving increased recording density and capacity in an optical recording medium.

One example of such achievements is found in DVDs, in which the wavelength of a recoding and reproducing laser beam is made shorter and the numerical aperture (AN) of an objective lens is made larger so that the diameter of a focal spot produced during recording or reproducing is reduced. Actually in DVDs, the recording and reproducing wavelength λ of 780 nm used in CDs is changed to 650 nm in DVDs, and the numerical aperture (NA) of 0.45 used in CDs to 0.6 in DVDs, whereby a recording capacity increased to 6- to 8-fold that of CDs (4.7 GB per side) has been achieved.

However, the increased numerical aperture will raise various problems. For example, the increased numerical aperture decreases the allowance for aberration produced due to an angle by which a disk surface is deviated from the perpendicular to the optical axis of an optical pickup, which is known as a tilt angle. In this relation, an allowance for tilt of an optical recording medium with respect to an optical system, which is known as a tilt margin M, is determined by a numerical aperture NA. In other words, the tilt margin M is proportional to $\lambda/\{t\times(NA)^3\}$ when λ denotes a wavelength of a recording and reproducing laser beam, and t denotes a thickness of a substrate. Therefore, in order to ensure a sufficient tilt margin M, it is required to reduce the thickness t of a substrate.

Accordingly, in DVDs, a sufficient tilt margin is ensured by reducing the substrate thickness to about one half (about 0.6 mm) of a typical thickness of conventional CD substrates (about 1.2 mm).

Recently, for the purpose of making it possible to record a high quality dynamic picture image for long hours, a system has been developed to achieve a large recording capacity (larger than 20 GB per side) corresponding to more than 4-fold that of DVDs by decreasing the wavelength λ of a recording and reproducing laser beam to about 400 nm and increasing the numerical aperture (NA) to 0.85.

The optical disk used in this system has a light transmitting layer with a thickness of about 0.1 mm in order to ensure the tilt margin, through which a laser beam for recording or reproducing is launched thereinto.

Moreover, in response to the request for further increase in recording capacity, there is proposed, for example, a so-called single sided dual layer disk that has, on its supporting substrate, a second recording layer (Layer 1), a space layer, a first recording layer (Layer 0), and a light transmitting layer and is used so that a laser beam for recording or reproducing enters through the light transmitting layer. The single sided dual layer disk is disclosed, for example, in JP-A-2000-11453.

DISCLOSURE OF THE INVENTION

OBJECT OF THE INVENTION

For the preparation of a single sided dual layer disk, there is a conceivable method, by which individual layers are formed in turn, such that a second recording layer (Layer 1) is formed on a supporting substrate having a thickness of about 1.1 mm with grooves formed, by a sputtering process, etc. followed by forming a space layer on the second recording layer by the application or sheet attachment, then forming a first recording layer (Layer 0) on the space layer by a sputtering process, etc., and forming a light transmitting layer on the first recording layer. However, because the space layer is as thick as a few to a few tens of micrometers at the time when the space layer is formed, it becomes impossible to maintain the concave-convex shape of groove ranging a few tens to a few hundreds of nanometers and therefore a first recording layer with its concave-convex shape of groove maintained cannot be formed.

Also, for the preparation of the single sided dual layer disk, lamination of upper and lower substrates, which has been performed in preparing conventional DVDs, is conceivable. However, the thickness of the light transmitting layer is about 0.1 mm, which is remarkably thin, and hence it is extremely difficult to form a first recording layer thereon and a simple lamination method cannot be applied.

The object of the invention is to provide a method of manufacturing an optical recording medium having two recording layers on a supporting substrate and an optical recording medium obtained according to the method.

SUMMARY OF THE INVENTION

The invention is a method of manufacturing an optical recording medium described below.

(1) A method of manufacturing an optical recording medium having a second recording layer (Layer 1), a space layer, a first recording layer (Layer 0), and a light transmitting layer, on a supporting substrate, including the steps of:

(A) providing a radiation-curable resin layer backed with a lining sheet on a stamper for the formation of information pits and/or grooves for the first recording layer, irradiating the resin layer with radiation to cure the resin layer, and then removing the stamper, thereby to form the light transmitting layer supported by the lining sheet;

(B) forming the first recording layer on the light transmitting layer;

(C) on the other hand, forming the second recording layer on the supporting substrate with information pits and/or grooves for the second recording layer formed;

(D) laminating the lining sheet with the light transmitting layer and the first recording layer formed and the supporting substrate with the second recording layer formed via the space layer so that the first recording layer and the second recording layer are located inside; and (E) removing the lining sheet.

(2) The method of manufacturing an optical recording medium of the above (1), wherein the step (A) includes forming the radiation-curable resin layer on the stamper and superposing the lining sheet on the resin layer, thereby to provide the radiation-curable resin layer backed with the lining sheet and irradiating the resin layer with radiation to cure the resin layer.

(3) The method of manufacturing an optical recording medium of the above (2), wherein the step (A) includes spin-coating the stamper with a radiation-curable resin thereby to form the radiation-curable resin layer.

(4) The method of manufacturing an optical recording medium of the above (2) or (3), wherein the step (A) includes forming the radiation-curable resin layer on the stamper, irradiating the radiation-curable resin layer with radiation to obtain the resin layer in a half-cured state, and superposing the lining sheet on the resin layer, thereby to provide the radiation-curable resin layer backed with the lining sheet and further irradiating the resin layer with radiation to cure the resin layer completely.

(5) The method of manufacturing an optical recording medium of the above (1), wherein the step (A) includes putting the radiation-curable resin on the stamper, placing the lining sheet thereon, and rotating them to obtain the resin layer of a predetermined thickness, thereby providing the radiation-curable resin layer backed with the lining sheet and irradiating the resin layer with radiation to cure the resin layer.

(6) The method of manufacturing an optical recording medium of any one of the above (1) to (5), wherein the radiation is ultraviolet ray.

(7) The method of manufacturing an optical recording medium of any one of the above (1) to (6), wherein the lining sheet has a permeability with respect to radiation.

(8) The method of manufacturing an optical recording medium of any one of the above (1) to (7), wherein a surface of the lining sheet on which side the resin layer is overlaid has been subjected to a peeling treatment.

(9) The method of manufacturing an optical recording medium of any one of the above (1) to (8), wherein the step (B) includes forming the first recording layer by at least one selected from among a PVD process, a CVD process, and a spin coating process.

(10) The method of manufacturing an optical recording medium of any one of the above (1) to (9), wherein the step (B) includes forming the first recording layer as a phase change type recording layer by a PVD or CVD process.

(11) The method of manufacturing an optical recording medium of the above (10), including performing the initialization of the first recording layer after the step (B).

(12) The method of manufacturing an optical recording medium of any one of the above (1) to (11), wherein the step (C) includes forming the second recording layer by at least one selected from among a PVD process, a CVD process, and a spin coating process.

(13) The method of manufacturing an optical recording medium of any one of the above (1) to (12), wherein the step (C) includes forming the second recording layer as a phase change type recording layer by a PVD or CVD process.

(14) The method of manufacturing an optical recording medium of the above (13), including performing the initialization of the second recording layer after the step (C).

As shown in (9), (10), (12), and (13), the formation of the first recording layer in the step (B) and the formation of the second recording layer in the step (C) may be performed appropriately according to the kinds of phase change type, read-only type, and write-once type medium.

(15) The method of manufacturing an optical recording medium of any one of the above (1) to (14), wherein the step (D) includes forming the space layer from a material selected from a group consisting of a radiation-curable resin, a two-part adhesive, and an adhesion material. Here, a radical ultraviolet-curable resin and a cation polymerizable ultraviolet-curable resin are cited as the radiation-curable resin, for example.

(16) The method of manufacturing an optical recording medium of the above (15), wherein the step (D) includes spin-coating the first recording layer on the lining sheet and/or the second recording layer on the supporting substrate with the radiation-curable resin to provide the space layer, then laminating the lining sheet and the supporting substrate via the space layer so that the first recording layer and the second recording layer are located inside, and irradiating the space layer with radiation to cure the space layer.

(17) The method of manufacturing an optical recording medium of the above (15), wherein the step (D) includes spin-coating the first recording layer on the lining sheet and/or the second recording layer on the supporting substrate with the cation polymerizable ultraviolet-curable resin to provide the space layer, then irradiating the space layer with ultraviolet ray, and laminating the lining sheet and the supporting substrate via the space layer so that the first recording layer and the second recording layer are located inside.

(18) The method of manufacturing an optical recording medium of the above (15), wherein the step (D) includes putting the radiation-curable resin on the second recording layer on the supporting substrate, placing the lining sheet thereon so that the first recording layer is located inside, and rotating them, thereby to bring the space layer to a predetermined thickness and to laminate the lining sheet and the supporting substrate via the space layer, and irradiating the space layer with radiation to cure the space layer.

(19) The method of manufacturing an optical recording medium of the above (15), wherein the step (D) includes putting the radiation-curable resin on the first recording layer on the lining sheet, placing the supporting substrate thereon so that the second recording layer is located inside, and rotating them, thereby to bring the space layer to a predetermined thickness and to laminate the lining sheet and the supporting substrate via the space layer, and irradiating the space layer with radiation to cure the space layer.

(20) The method of manufacturing an optical recording medium of the above (15), wherein the step (D) includes spin-coating the first recording layer on the lining sheet with an liquid A of the two-part adhesive and the second recording layer on the supporting substrate with an liquid B of the two-part adhesive, or spin-coating the first recording layer on the lining sheet with the liquid B of the two-part adhesive and the second recording layer on the supporting substrate with the liquid A of the two-part adhesive, and then, laminating the lining sheet and the supporting substrate so that the first recording layer and the second recording layer are located inside.

(21) The method of manufacturing an optical recording medium of the above (15), wherein the step (D) includes sandwiching and squeezing the adhesion material used as the space layer between the first recording layer on the lining sheet and the second recording layer on the supporting substrate, thereby to laminate the lining sheet and the supporting substrate via the space layer.

(22) The method of manufacturing an optical recording medium of any one of the above (1) to (21), wherein the thickness of the space layer is 5 to 30 μm.

(23) The method of manufacturing an optical recording medium of any one of the above (1) to (22), wherein the thickness of the light transmitting layer is 30 to 150 μm.

Further, the invention is an optical recording medium as described below.

(24) An optical recording medium having a second recording layer (Layer 1), a space layer, a first recording layer (Layer 0), and a light transmitting layer on a supporting substrate, obtained by the manufacturing method of any one of the above (1) to (23).

MODES FOR CARRYING OUT THE INVENTION

Figure 1:
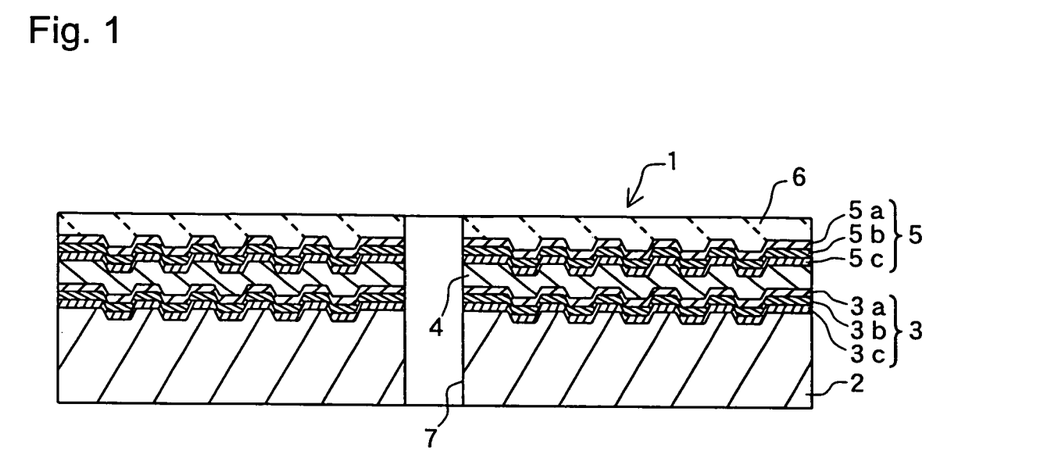
FIG. 1 is a schematic sectional view of an example of the optical disk manufactured by the method of the invention.
Figure 2:
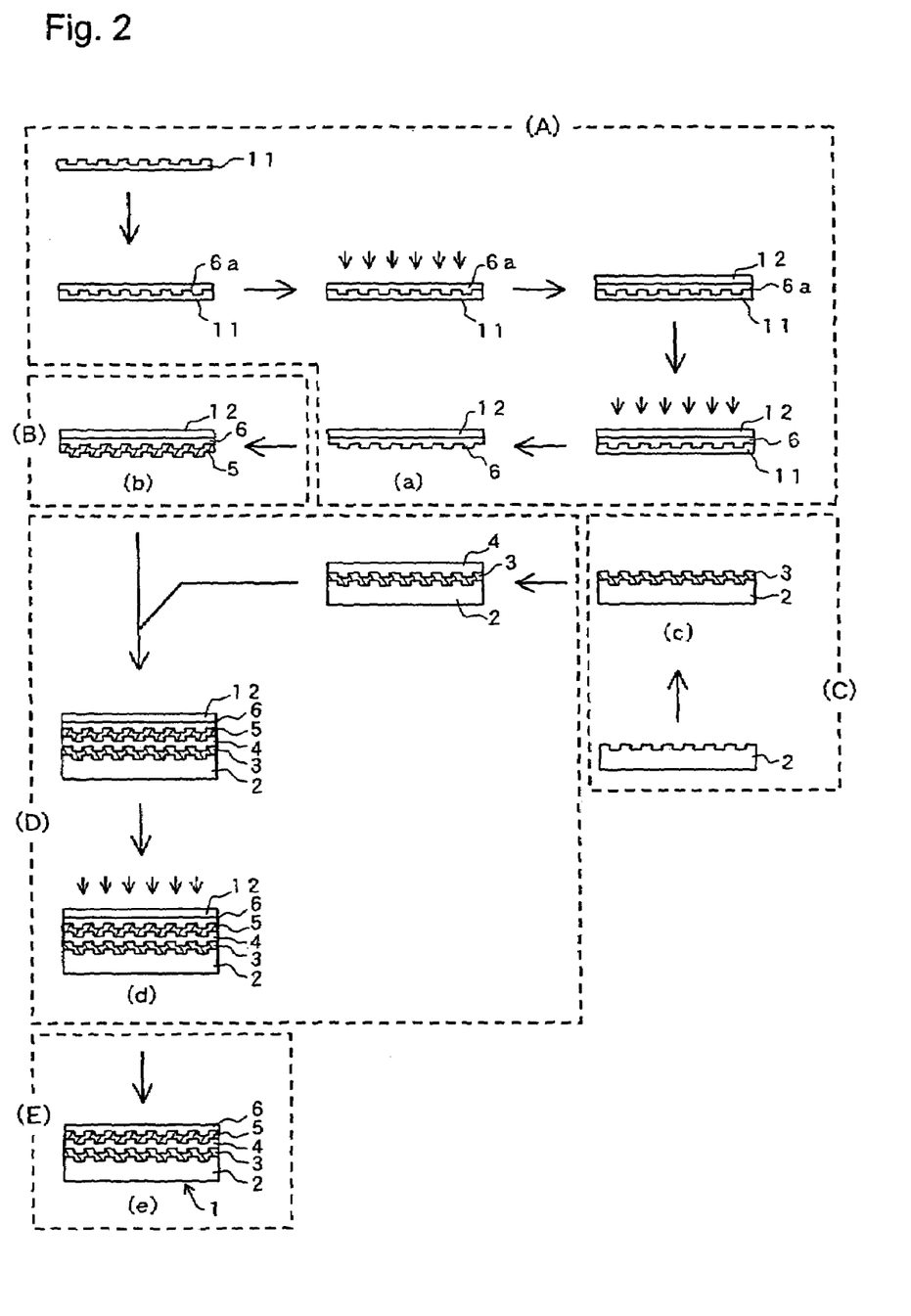
FIG. 2 is an outline process drawing of an example of the manufacturing method of the invention.

A method of manufacturing an optical recording medium (hereinafter abbreviated to an optical disk) will be described in reference to the drawings. FIG. 1 is a schematic sectional view of an example of the optical disk manufactured by the method of the invention. FIG. 2 is an outline process drawing of an example of the manufacturing method of the invention.

First, in reference to FIG. 1, an example of the optical disk manufactured by the method of the invention will be described in outline taking a phase change type optical disk as a example.

In FIG. 1, the optical disk (1) has, on a face of the supporting substrate (2) on the side where fine scale concave-convex are formed, a second recording layer (Layer 1) (3), a space layer (4), a first recording layer (Layer 0) (5), and a light transmitting layer (6) in this order, and also has a center hole (7). The second recording layer (3) and the first recording layer (5) each consist of a plurality of layers including a phase change recording film; the second recording layer (3) is made up of, from the side close to the light transmitting layer (6), a dielectric film (3a), a phase change recording film (3b), a dielectric film (3c), and a reflection film (not shown in the drawing), and the first recording layer (5) is made up of, from the side close to the light transmitting layer (6), a dielectric film (5a), a phase change recording film (5b), and a dielectric film (5c).

The optical disk (1) is used so that a laser beam for recording or reproducing enters through the light transmitting layer (6).

The second recording layer (3) and the first recording layer (5) may take on various aspects in layers configuration. For example, even in the case of a phase change type optical disk, a multi-layer configuration for the dielectric film may be taken on.

In the case of a read-only type optical disk, the second and first recording layers are made up of reflection films, which cover information pits formed in the supporting substrate and the light transmitting layer. The reflection films are made by a PVD process.

In the case of a write-once type optical disk, the second recording layer and/or first recording layer are/is made up of, from the side close to the light transmitting layer, a write-once type recording film (e.g. dye-based film), and a reflection film that is provided on an as-needed basis. The recording film is formed, for example, by spin-coating of dye solution; the reflection film is formed by a PVD process.

Now, in reference to FIG. 2, the manufacturing method of the invention will be described.

In the light transmitting layer formation step (A), a radiation-curable resin layer (6a) is provided on a stamper (11) with fine scale concave-convex of a required pattern for the formation of information pits and/or grooves for the first recording layer formed, followed by superposing a lining sheet (12) on this resin layer (6a), irradiating the resin layer (6a) with radiation to cure the resin layer (6), and then removing the stamper (11) to form a light transmitting layer (6) integrated with the lining sheet (12).

In the step (A), the uncured radiation-curable resin layer (6a) may be provided on the stamper (11) by spin-coating a radiation-curable resin.

Specifically, the radiation-curable resin is constituted preferably of the ultraviolet- (electro-) curable compound or its composition for polymerization. Examples include monomers, oligomers, polymers and the like in which groups to be crosslinked or polymerized by irradiation with UV rays, such as acrylic type double bonds such as in ester compounds of acrylate and methacrylate, epoxy acrylates and urethane acrylates, allyl type double bonds such as in diallyl phthalate, and unsaturated double bonds such as in maleic acid derivatives and the like have been contained or introduced into a molecule. These are preferably multifunctional, particularly trifunctional or more, and may be used alone or in combination thereof.

The ultraviolet-curable monomer is preferably a compound with a molecular weight of less than 2000, and the oligomer is preferably a compound with a molecular weight of 2000 to 10000. These include styrene, ethyl acrylate, ethylene glycol diacrylate, ethylene glycol dimethacrylate, diethylene glycol diacrylate, diethylene glycol methacrylate, 1,6-hexane glycol diacrylate, 1,6-hexane glycol dimethacrylate etc., and particularly preferable examples include pentaerythritol tetra(meth)acrylate, pentaerythritol (meth)acrylate, trimethylolpropane tri(meth)acrylate, trimethylolpropane di(meth)acrylate, (meth)acrylate of phenol ethylene oxide adduct, etc. Besides, the ultraviolet-curable oligomer includes oligoester acrylate, acrylic modified urethane elastomer etc.

As the ultraviolet-curable material, a composition containing epoxy resin and a photo-cation polymerization catalyst is also preferably used. The epoxy resin is preferably alicyclic epoxy resin, particularly the resin having 2 or more epoxy groups in the molecule. The alicyclic epoxy resin is preferably one or more of the following resins: 3,4-epoxycyclohexyl methyl-3,4-epoxycyclohexane carboxylate, bis-(3,4-epoxycyclohexylmethyl)adipate, bis-(3,4-epoxycyclohexyl)adipate, 2-(3,4-epoxycyclohexyl-5,5-spiro-3,4-epoxy)cyclohexane-metha-dioxane, bis(2,3-epoxycyclopentyl)ether and vinyl cyclohexene dioxide etc. Although the epoxy equivalent of alicyclic epoxy resin is not particularly limited, it is preferably 60 to 300, more preferably 100 to 200 for attaining excellent curable properties.

The photo-cation polymerization catalyst used may be any of known ones and is not particularly limited. For example, it is possible to use one or more of the followings: metal fluoroborates and boron trifluoride complexes, bis(perfluoroalkyl sulfonyl) methane metal salts, aryl diazonium compounds, aromatic onium salts of the group 6A elements, aromatic onium salts of the group 5A elements, dicarbonyl chelate of the groups 3A to 5A elements, thiopyrylium salts, the group 6A elements having MF6 anions (M is P, As or Sb), triaryl sulfonium complex salts, aromatic iodonium complex salts, aromatic sulfonium complex salts etc., and it is particularly preferable to use one or more of the followings: polyaryl sulfonium complex salts, aromatic sulfonium salts or iodonium salts of halogen-containing complexions, and aromatic onium salts of the group 3A elements, the group 5A elements and the group 6A elements.

It is desirable for the radiation-curable resin used for the light transmitting layer to have a viscosity of 1,000 to 10,000 cp (at 25° C.).

For the radiation, it is desirable to use ultraviolet ray.

In the step (A), it is desirable to irradiate the uncured radiation-curable resin layer (6a) with radiation at an appropriate integral quantity of light to bring the resin layer (6a) to a half-cured state, superpose the lining sheet (12) on this resin layer (6a), and further irradiate the resin layer (6a) with radiation to completely cure it to finish the light transmitting layer (6).

The stamper (11) is made of nickel (Ni), for example. For the lining sheet (12), glass, plastics including a polyolefin resin, and the like having permeability to radiation may be used, and its surface may be subjected to a peeling treatment by fluorine-coating, etc. The thickness of the light transmitting layer (6) is 30 to 150 μm.

Next, the stamper (11) is removed. The light transmitting layer (6) is thus formed which is supported by the lining sheet (12) and has information pits and/or grooves for the first recording layer formed in its surface (a).

Figure 3:
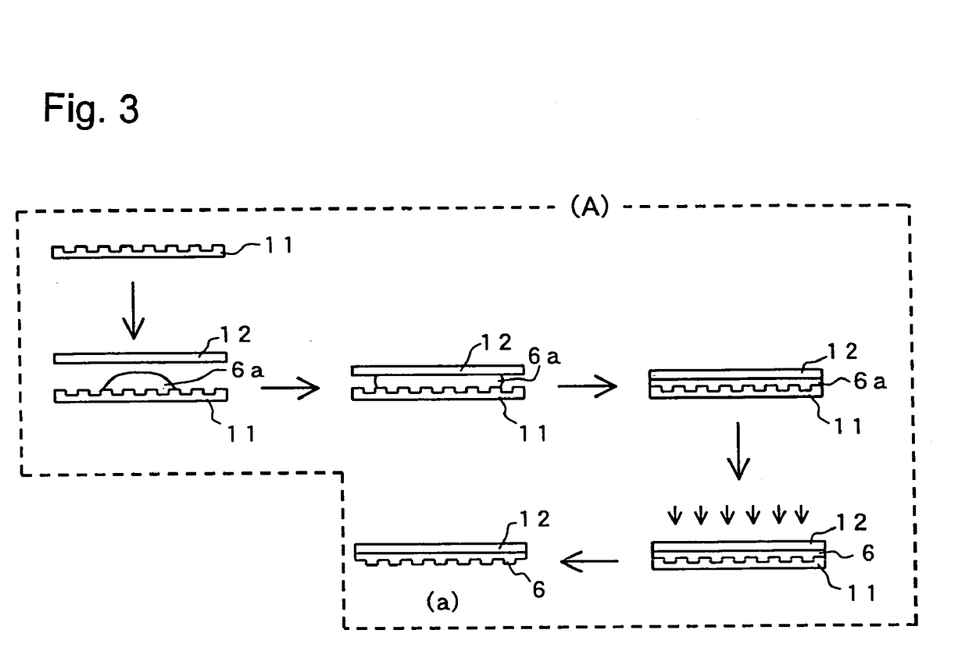
FIG. 3 is an illustration showing an exemplary modification of the light transmitting layer formation step (A) of the manufacturing method of the invention.

In this invention, as an exemplary modification of the step (A), operations shown in FIG. 3 may be performed.

In reference to FIG. 3, a predetermined amount of the radiation-curable resin (6a) is put on the stamper (11) to place the lining sheet (12) thereon and rotate both the stamper (11) and the lining sheet (12) about the axis thereof. These operations can offer the resin layer (6a) having a predetermined thickness between the stamper (11) and the lining sheet (12). As in the case of FIG. 2, the resin layer (6a) is irradiated with radiation to be cured and then the stamper (11) is removed. Thus, the light transmitting layer (6) is formed, which is integrated with the lining sheet (12) and has information pits and/or grooves for the first recording layer formed in its surface (a).

In the first recording layer formation step (B), a first recording layer (5) is formed on the light transmitting layer (6). For example, in the case of a phase change recording layer, the first recording layer (5) may be formed by a PVD process, such as vacuum deposition, electron beam deposition, laser ablation, ion plating, and sputtering, or a CVD process. For example, in the case of forming the first recording layer (5) described in FIG. 1, a dielectric film (5a), a phase change recording film (5b), and a dielectric film (5c) are formed on the light transmitting layer (6) in turn.

The phase change recording film (5b) is formed of a material changing reversibly by irradiation of laser beam between the crystalline state and the amorphous state, and exhibiting different optical properties between these states. Examples of such material include Ge—Sb—Te, In—Sb—Te, Sn—Se—Te, Ge—Te—Sn, In—Se—Tl, and In—Sb—Te. Further, to any such matrial, a trace of at least one metal selected from Co, Pt, Pd, Au, Ag, Ir, Nb, Ta, V, W, Ti, Cr, Zr, Bi, In and the like may be added. A trace of reductive gas such as nitrogen also may be added.

The thickness of the phase change recording film (5b) is not specifically limited and it is about 3 to 30 nm, for example.

The dielectric films (5a) and (5c) are formed on the upside and downside of the recording film (5b) with the recording film sandwiched therebetween. The dielectric films (5a) and (5c) have a function to mechanically and chemically protect the recording film (5b) and a function to adjust optical characteristics as an interference layer. Each of the dielectric films (5a) and (5c) may consist of a single layer or may consist of a plurality of layers.

It is desirable that the dielectric films (5a) and (5c) are formed from an oxide, a nitride, a sulfide, or a fluoride containing at least one metal selected from among Si, Zn, Al, Ta, Ti, Co, Zr, Pb, Ag, Zn, Sn, Ca, Ce, V, Cu, Fe, and Mg, or a composite thereof. Moreover, it is desirable that the dielectric films (5a) and (5c) have an extinction coefficient k equal to or less than 0.1.

The thickness of the dielectric film (5c) is not specifically limited, and it is preferably about 10 to 200 nm, for example. The thickness of the dielectric film (5a) is not specifically limited, and it is preferably about 10 to 200 nm, for example. Selecting the thicknesses of the dielectric films (5a) and (5c) in these ranges allows the adjustment of the reflectance.

A reflection film may be provided on the dielectric film (5c), on an as-needed basis. For the material of the reflection film, metal elements, metalloid elements, semiconductor elements, or their compound alone or the composite of the compounds may be used. More specifically, it may be selected from among well-known reflection film materials including Au, Ag, Cu, Al, Pd and the like, for example. It is preferable to make the reflection film as a translucent thin film with a thickness of 5 to 50 nm.

Thus, the first recording layer (5) is formed on the light transmitting layer (6) on the lining sheet (12)(b).

On the other hand, in the second recording layer formation step (C), a second recording layer (3) is formed on a supporting substrate (2) with information pits and/or grooves for the second recording layer formed.

The supporting substrate (2) has a thickness of 0.3 to 1.6 mm, preferably a thickness of 0.5 to 1.3 mm, and has fine scale concave-convex, i.e. information pits, grooves for the second recording layer, etc. formed in its face on the side where the second recording layer (3) is formed.

The supporting substrate (2) is not necessarily transparent optically; it may be formed from various plastic materials including acrylic resins including polycarbonate resin, polymethyl methacrylate (PMMA) and the like, polyolefin resin and the like, glass, ceramics, metals, etc. The concave-convex pattern is often prepared by injection molding in the case of using a plastic material; in a case other than the plastic material, the pattern is shaped by a photopolymer process (2P process).

The second recording layer (3) may be formed by a PVD process, such as vacuum deposition, electron beam deposition, laser ablation, ion plating, and sputtering, or a CVD process, for example in the case where it is a phase change recording layer. For instance, in the case of forming the second recording layer (3) described in FIG. 1, a reflection film, a dielectric film (3c), a phase change recording film (3b), and a dielectric film (3a) are formed on a supporting substrate (2), in turn. The materials of the phase change recording film (3b), dielectric film (3a), dielectric film (3c), and reflection film are respectively the same as those described above. The dielectric film (3a) and the dielectric film (3c) may each consist of a single layer or consist of a plurality of layers.

The thickness of the phase change recording film (5b) is not specifically limited, and it is approximately 3 to 50 nm, for example. The thickness of the dielectric film (3c) is not specifically limited, and it is preferably about 10 to 200 nm, for example. The thickness of the dielectric film (3a) is not specifically limited, and it is preferably about 10 to 200 nm, for example. Selecting the thicknesses of the dielectric films (3a) and (3c) in these ranges allows the adjustment of the reflectance. It is preferable that the reflection film is formed as a thin film having a thickness of 20 to 200 nm.

Thus, the second recording layer (3) is formed on the supporting substrate (2)(c).

In the lamination step (D), the lining sheet (12) with the light transmitting layer (6) and the first recording layer (5) formed, which is obtained in the step (B), and the supporting substrate (2) with the second recording layer (3) formed, which is obtained in the step (C), are laminated via a space layer (4) so that the first recording layer (5) and the second recording layer (3) are located inside.

The space layer may be formed from a material selected from a group consisting of a radiation-curable resin, a two-part adhesive, and an adhesion material. As the adhesion material, a contact-bonding sheet may be used.

In the case of using an adhesion material, the adhesion material as a space layer is sandwiched and squeezed between the first recording layer (5) on the lining sheet (12) and the second recording layer (3) on the supporting substrate (2), thereby laminating the lining sheet (12) and the supporting substrate (2) via the space layer. In this case, no curing process is required. In addition, it is desirable to laminate them under a reduced pressure so as to prevent a bubble from entering.

In the case of using a two-part adhesive, for example, the first recording layer (5) on the lining sheet (12) and the second recording layer (3) on the supporting substrate (2) are spin-coated respectively with a liquid A and a liquid B, and the lining sheet (12) and the supporting substrate (2) are laminated and bonded preferably under a reduced pressure in order to eliminate a bubble.

Further, of heat-curing resins, a resin having a higher curing speed may be used as a material for forming the space layer.

In this invention, radiation-curable resins are preferable as a material of the space layer; of radiation-curable resins, a radical ultraviolet-curable resin and a cation polymerizable ultraviolet-curable resin are more preferable.

In the case of using a radiation-curable resin, either the first recording layer (5) or the second recording layer (3), or both of the first recording layer (5) and the second recording layer (3) is or are spin-coated with the radiation-curable resin, followed by laminating the lining sheet (12) and the supporting substrate (2) and irradiating the resin layer with radiation to cure the resin layer.

Typically, as shown in FIG. 2, the second recording layer (3) on the supporting substrate (2) is spin-coated with a radiation-curable resin thereby to provide an uncured space layer (4), and then the lining sheet (12) with the light transmitting layer (6) and the first recording layer (5) formed and this supporting substrate (2) are laminated via the space layer (4) so that the first recording layer (5) and the second recording layer (3) are located inside, followed by irradiating the space layer (4) with radiation to cure the space layer (4) (d).

Although not shown in the drawing, the same (d) can be also obtained by: spin-coating the first recording layer (5) on the lining sheet (12) with a radiation-curable resin thereby to provide an uncured space layer (4); laminating the lining sheet and the supporting substrate with the second recording layer formed via the space layer so that the first recording layer and the second recording layer are located inside; and irradiating the space layer with radiation thereby to cure the space layer. Further, although not shown in the drawing, both the first recording layer (5) and the second recording layer (3) may be each spin-coated with a radiation-curable resin thereby to provide an uncured space layers having a predetermined thickness.

In the case of using a cation polymerizable ultraviolet-curable resin of radiation-curable resins, it is recommendable that in the step (D) the first recording layer on the lining sheet and/or the second recording layer on the supporting substrate are/is spin-coated with the cation polymerizable ultraviolet-curable resin to provide an uncured space layer(s), followed by irradiating the space layer with ultraviolet ray and laminating the lining sheet and the supporting substrate via the space layer under a reduced pressure, more preferably under vacuum, so that the first recording layer and the second recording layer are located inside. After the lamination, the curing reaction proceeds gradually and the bonding therebetween is complete.

Figure 4:
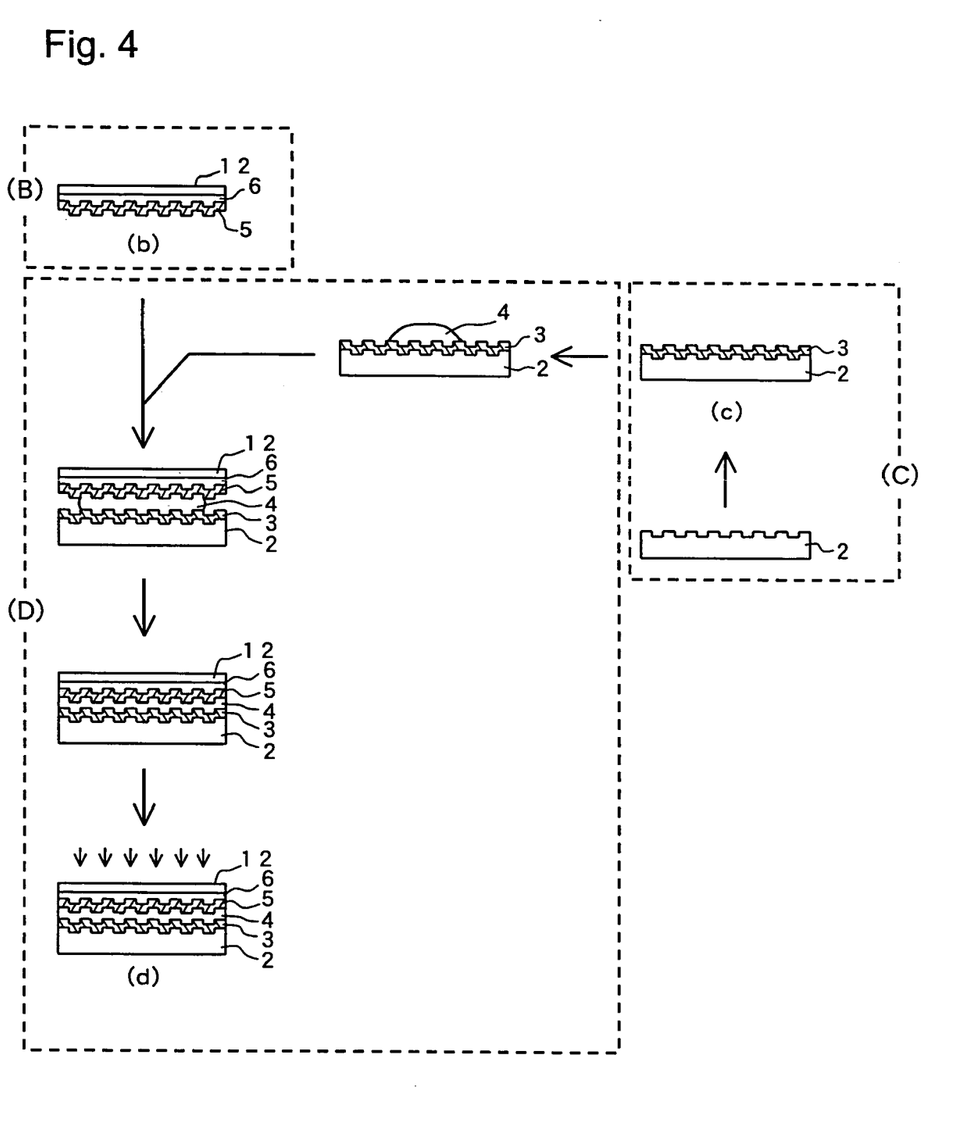
FIG. 4 is an illustration showing an exemplary modification of the lamination step (D) of the manufacturing method of the invention.

In this invention, as an exemplary modification of the step (D), the operations shown in FIG. 4 may be carried out.

In reference to FIG. 4, a predetermined amount of a radiation-curable resin (4) is put on the second recording layer (3) on the supporting substrate (2), followed by placing the lining sheet (12) thereon so that the first recording layer (5) is located inside and rotating the supporting substrate (2) and the lining sheet (12) together about the axis thereof. By these operations, the space layer (4) having a predetermined thickness may be obtained between the second recording layer (3) and the first recording layer (5), and the lining sheet (12) and the supporting substrate (2) are laminated via the space layer (4). As in the case of FIG. 2, the space layer (4) is irradiated with radiation to be cured (d).

Further, as an exemplary modification of FIG. 4, a radiation-curable resin may put on the first recording layer (5) on the lining sheet (12), followed by placing the supporting substrate (2) thereon so that the second recording layer (3) is located inside and rotating the supporting substrate (2) and the lining sheet (12) together about the axis thereof.

The thickness of the space layer (4) is 5 to 30 μm. According to the invention, the space layer having such thickness can be easily formed while maintaining the fine scale concave-convex forms of the information pits and/or grooves with respect to both the first recording layer and the second recording layer.

In the lining sheet removing step (E), the lining sheet (12) is removed from the side of the light transmitting layer (6) to obtain an optical disk (1)(e). If a surface of the lining sheet (12) on the side of the light transmitting layer (6) has been subjected to a peeling treatment such as fluorine coating, the removal is easy.

Also in this invention, in the case of manufacturing an optical disk with a phase change type recording film, it is desirable to perform the initialization of the first recording layer after the first recording layer formation step (B) before the lamination step (D). Likewise, it is desirable to perform the initialization of the second recording layer after the second recording layer formation step (C) before the lamination step (D). In the case where the two recording layers are performed and then the initialization of both the recording layers is performed at a time, the second recording layer and the first recording layer can be different in the initialized state thereof However, according to the preferred aspect, such a bad effect does not occur.

EXAMPLES

The invention will be further described in detail citing an example below, but the invention is not limited to the example.

Example 1

The optical disk was prepared according to the following procedure.

[Light-Transmission Layer Formation Step (A)]

A stamper (which was made of Ni and had a diameter of 120 mm and a thickness of 0.3 mm) with fine scale concave-convex of a required pattern for the formation of lands/grooves for the first recording layer formed was spin-coated with an urethane acrylate-based ultraviolet-curable resin (viscosity: 5000 cp at 25° C.), followed by irradiating it with radiation (integral quantity of UV light: 140 mJ/cm$^2$) to obtain a resin layer in a half-cured state. A lining sheet (which was made of glass and had a diameter of 130 mm and a thickness of 1.2 mm) was superposed on the resin layer, followed by further irradiating the resin layer with radiation (integral quantity of UV light: 3000 mJ/cm$^2$) to cure the resin layer completely. After that, the stamper was removed. Thus, a light transmitting layer supported by the lining sheet was formed. The light transmitting layer had a thickness of 90 μm. In the resultant land/groove substrate, the depth of grooves formed on a surface of the light transmitting layer was λ/10, when it was expressed with an optical path length at the wave length λ=405 nm, and the record track pitch was 0.3 μm.

[First Recording Layer Formation Step (B)]

Using a ZnS(80 mol %)-SiO$_2$(20 mol %) target, a dielectric film having a thickness of 50 nm was formed on a surface of the light transmitting layer by a sputtering process.

Next, using an alloy target made up of a phase change material, a 6 nm-thick recording film was formed on the surface of the dielectric film by a sputtering process. The composition of the recording film was based on AgInSbTe.

Then, an 80 nm-thick dielectric film was formed on the surface of the recording film by a sputtering process using a ZnS(80 mol %)-SiO$_2$(20 mol %) target.

The first recording layer was thus formed, and subsequently the initialization was performed by a laser having a wave length 810 nm using a LK201B manufactured by Shibasoku Co. Ltd.

[Second Recording Layer Formation Step (C)]

A 50 nm-thick reflection film made up of an alloy containing Ag as a main ingredient was formed on a surface of a disk-like supporting substrate with lands/grooves for the second recording layer formed (which was made from a polycarbonate, and had a diameter of 120 mm and a thickness of 1.1 mm) by a sputtering process. In the resultant land/groove substrate, the depth of grooves was λ/10, when it was expressed with an optical path length at the wave length λ=405 nm, and the record track pitch was 0.3 μm.

Then, with a ZnS(80 mol %)-SiO$_2$(20 mol %) target, a 90 nm-thick dielectric film was formed on a surface of the reflection film by a sputtering process.

Next, using an alloy target made up of a phase change material, a 10 nm-thick recording film was formed on the surface of the dielectric film by a sputtering process. The composition of the recording film was based on AgInSbTe.

Then, a 120 nm-thick dielectric film was formed on the surface of the recording film by a sputtering process using a ZnS(80 mol %)-SiO$_2$(20 mol %) target. The second recording layer was thus formed, and subsequently the initialization was performed in the same way as the foregoing.

[Lamination Step (D)]

The second recording layer on the supporting substrate was spin-coated with an ultraviolet-curable resin (MPZ208 manufactured by Nippon Kayaku Co. Ltd.) to provide an uncured space layer. The supporting substrate and the lining sheet of the step (B) with the light transmitting layer and the first recording layer formed were laminated via the space layer under a reduced pressure so that the first recording layer and the second recording layer were located inside. The space layer was irradiated with ultraviolet ray from the side of the lining sheet (integral quantity of UV light: 300 mJ/cm$^2$) to cure. The thickness of the space layer was 20 μ.

[Lining Sheet Removing Step (E)]

The lining sheet was removed from the side of the light transmitting layer to obtain an optical disk.

In the above example, an example of the manufacture of a single sided dual layer, phase change type optical disk has been shown. However, the manufacturing method of the invention may be applied to not only an optical disk having a phase change type recording layer but also a read-only type optical disk and a write-once type optical disk. Therefore, the foregoing example is merely an exemplification at all points, and it should not be interpreted exclusively. Moreover, any change belonging to a range equivalent to the claim falls within a range of the invention.

Industrial Applicability

The invention provides a method of manufacturing an optical recording medium having two recording layers on a supporting substrate and an optical recording medium obtained by the method. Both the two recording layers maintain the shape of fine scale concave-convex of specific information pits and/or grooves.

The invention claimed is:

1. A method of manufacturing an optical recording medium having a second recording layer, a space layer, a first recording layer, and a light transmitting layer, on a supporting substrate, including the steps of:
   (A) providing a radiation-curable resin layer backed with a lining sheet on a stamper for the formation of information pits and/or grooves for the first recording layer, irradiating the resin layer with radiation to cure the resin layer, and then removing the stamper, thereby to form the light transmitting layer supported by the lining sheet;
   (B) forming the first recording layer on the light transmitting layer;
   (C) forming the second recording layer on the supporting substrate with information pits and/or grooves for the second recording layer formed;
   (D) laminating the lining sheet with the light transmitting layer and the first recording layer formed and the supporting substrate with the second recording layer formed via the space layer so that the first recording layer and the second recording layer are located inside; and
   (E) removing the lining sheet,
   wherein the step (A) includes forming the radiation-curable resin layer on the stamper and superposing the lining sheet on the resin layer, thereby to provide the radiation-curable resin layer backed with the lining sheet and irradiating the resin layer with radiation to cure the resin layer.

2. The method of manufacturing an optical recording medium according to claim 1, wherein the step (A) includes spin-coating the stamper with a radiation-curable resin thereby to form the radiation-curable resin layer.

3. The method of manufacturing an optical recording medium according to claim 1, wherein the step (A) includes forming the radiation-curable resin layer on the stamper, irradiating the radiation-curable resin layer with radiation to obtain the resin layer in a half-cured state, and superposing the lining sheet on the resin layer, thereby to provide the radiation-curable resin layer backed with the lining sheet and further irradiating the resin layer with radiation to cure the resin layer completely.

4. The method of manufacturing an optical recording medium according to claim 1, wherein the radiation is an ultraviolet ray.

5. The method of manufacturing an optical recording medium according to claim 1, wherein the lining sheet has a permeability with respect to radiation.

6. The method of manufacturing an optical recording medium according to claim 1, wherein a surface of the lining sheet on which side the resin layer is overlaid has been subjected to a peeling treatment.

7. The method of manufacturing an optical recording medium according to claim 1, wherein the step (B) includes forming the first recording layer by at least one selected from among a PVD process, a CVD process, and a spin coating process.

8. The method of manufacturing an optical recording medium according to claim 1, wherein the step (B) includes forming the first recording layer as a phase change type recording layer by a PVD or CVD process.

9. The method of manufacturing an optical recording medium according to claim 8, including performing the initialization of the first recording layer after the step (B).

10. The method of manufacturing an optical recording medium according to claim 1, wherein the step (C) includes forming the second recording layer by at least one selected from among a PVD process, a CVD process, and a spin coating process.

11. The method of manufacturing an optical recording medium according to claim 1, wherein the step (C) includes forming the second recording layer as a phase change type recording layer by a PVD or CVD process.

12. The method of manufacturing an optical recording medium according to claim 11, including performing the initialization of the second recording layer after the step (C).

13. The method of manufacturing an optical recording medium according to claim 1, wherein the step (D) includes forming the space layer from a material selected from a group consisting of a radiation-curable resin, a two-part adhesive, and an adhesion material.

14. The method of manufacturing an optical recording medium according to claim 13, wherein the step (D) includes spin-coating the first recording layer on the lining sheet and/or the second recording layer on the supporting substrate with the radiation-curable resin to provide the space layer, then laminating the lining sheet and the supporting substrate via the space layer so that the first recording layer and the second recording layer are located inside, and irradiating the space layer with radiation to cure the space layer.

15. The method of manufacturing an optical recording medium according to claim 13, wherein the step (D) includes spin-coating the first recording layer on the lining sheet and/or the second recording layer on the supporting substrate with the cation polymerizable ultraviolet-curable resin to provide the space layer, then irradiating the space layer with ultraviolet ray, and laminating the lining sheet and the supporting substrate via the space layer so that the first recording layer and the second recording layer are located inside.

16. The method of manufacturing an optical recording medium according to claim 13, wherein the step (D) includes putting the radiation-curable resin on the second recording layer on the supporting substrate, placing the lining sheet thereon so that the first recording layer is located inside, and rotating them, thereby to bring the space layer to a predetermined thickness and to laminate the lining sheet and the supporting substrate via the space layer, and irradiating the space layer with radiation to cure the space layer.

17. The method of manufacturing an optical recording medium according to claim 13, wherein the step (D) includes putting the radiation-curable resin on the first recording layer on the lining sheet, placing the supporting substrate thereon so that the second recording layer is located inside, and rotating them, thereby to bring the space layer to a predetermined thickness and to laminate the lining sheet and the supporting substrate via the space layer, and irradiating the space layer with radiation to cure the space layer.

18. The method of manufacturing an optical recording medium according to claim 13, wherein the step (D) includes spin-coating the first recording layer on the lining sheet with a liquid A of the two-part adhesive and the second recording layer on the supporting substrate with a liquid B of the two-part adhesive, or spin-coating the first recording layer on the lining sheet with the liquid B of the two-part adhesive and the second recording layer on the supporting substrate with the liquid A of the two-part adhesive, and then, laminating the lining sheet and the supporting substrate so that the first recording layer and the second recording layer are located inside.

19. The method of manufacturing an optical recording medium according to claim 13, wherein the step (D) includes sandwiching and squeezing the adhesion material used as the space layer between the first recording layer on the lining sheet and the second recording layer on the supporting substrate, thereby to laminate the lining sheet and the supporting substrate via the space layer.

20. The method of manufacturing an optical recording medium according to claim 1, wherein the thickness of the space layer is 5 to 30 µm.

21. The method of manufacturing an optical recording medium according to claim 1, wherein the thickness of the light transmitting layer is 30 to 150 µm.

22. A method of manufacturing an optical recording medium having a second recording layer, a space layer, a first recording layer, and a light transmitting layer, on a supporting substrate, including the steps of:

(A) providing a radiation-curable resin layer backed with a lining sheet on a stamper for the formation of information pits and/or grooves for the first recording layer, irradiating the resin layer with radiation to cure the resin layer, and then removing the stamper, thereby to form the light transmitting layer supported by the lining sheet;

(B) forming the first recording layer on the light transmitting layer;

(C) forming the second recording layer on the supporting substrate with information pits and/or grooves for the second recording layer formed;

(D) laminating the lining sheet with the light transmitting layer and the first recording layer formed and the supporting substrate with the second recording layer formed via the space layer so that the first recording layer and the second recording layer are located inside; and (E) removing the lining sheet, wherein the step (A) includes putting the radiation-curable resin on the stamper, placing the lining sheet thereon, and rotating them to obtain the resin layer of a predetermined thickness, thereby providing the radiation-curable resin layer backed with the lining sheet and irradiating the resin layer with radiation to cure the resin layer.

23. The method of manufacturing an optical recording medium according to claim 22, wherein the radiation is an ultraviolet ray.

24. The method of manufacturing an optical recording medium according to claim 22, wherein the lining sheet has a permeability with respect to radiation.

25. The method of manufacturing an optical recording medium according to claim 22, wherein a surface of the lining sheet on which side the resin layer is overlaid has been subjected to a peeling treatment.

26. The method of manufacturing an optical recording medium according to claim 22, wherein the step (B) includes forming the first recording layer by at least one selected from among a PVD process, a CVD process, and a spin coating process.

27. The method of manufacturing an optical recording medium according to claim 22, wherein the step (B) includes forming the first recording layer as a phase change recording layer by a PVD or CVD process.

28. The method of manufacturing an optical recording medium according to claim 27, including performing the initialization of the first recording layer after the step (B).

29. The method of manufacturing an optical recording medium according to claim 22, wherein the step (C) includes forming the second recording layer by at least one selected from among a PVD process, a CVD process, and a spin coating process.

30. The method of manufacturing an optical recording medium according to claim 22, wherein the step (C) includes forming the second recording layer as a phase change recording layer by a PVD or CVD process.

31. The method of manufacturing an optical recording medium according to claim 30, including performing the initialization of the second recording layer after the step (C).

32. The method of manufacturing an optical recording medium according to claim 22, wherein the step (D) includes forming the space layer from a material selected from a group consisting of a radiation-curable resin, a two-part adhesive, and an adhesion material.

33. The method of manufacturing an optical recording medium according to claim 32, wherein the step (D) includes spin-coating the first recording layer on the lining sheet and/or the second recording layer on the supporting substrate with the radiation-curable resin to provide the space layer, then laminating the lining sheet and the supporting substrate via the space layer so that the first recording layer and the second recording layer are located inside, and irradiating the space layer with radiation to cure the space layer.

34. The method of manufacturing an optical recording medium according to claim 32, wherein the step (D) includes spin-coating the first recording layer on the lining sheet and/or the second recording layer on the supporting substrate with the cation polymerizable ultraviolet-curable resin to provide the space layer, then irradiating the space layer with ultraviolet ray, and laminating the lining sheet and the supporting substrate via the space layer so that the first recording layer and the second recording layer are located inside.

35. The method of manufacturing an optical recording medium according to claim 32, wherein the step (D) includes putting the radiation-curable resin on the second recording layer on the supporting substrate, placing the lining sheet thereon so that the first recording layer is located inside, and rotating them, thereby to bring the space layer to a predetermined thickness and to laminate the lining sheet and the supporting substrate via the space layer, and irradiating the space layer with radiation to cure the space layer.

36. The method of manufacturing an optical recording medium according to claim 32, wherein the step (D) includes putting the radiation-curable resin on the first recording layer on the lining sheet, placing the supporting substrate thereon so that the second recording layer is located inside, and rotating them, thereby to bring the space layer to a predetermined thickness and to laminate the lining sheet and the supporting substrate via the space layer, and irradiating the space layer with radiation to cure the space layer.

37. The method of manufacturing an optical recording medium according to claim 32, wherein the step (D) includes spin-coating the first recording layer on the lining sheet with a liquid A of the two-part adhesive and the second recording layer on the supporting substrate with a liquid B of the two-part adhesive, or spin-coating the first recording layer on the lining sheet with the liquid B of the two-part adhesive and the second recording layer on the supporting substrate with the liquid A of the two-part adhesive, and then, laminating the lining sheet and the supporting substrate so that the first recording layer and the second recording layer are located inside.

38. The method of manufacturing an optical recording medium according to claim 32, wherein the step (D) includes sandwiching and squeezing the adhesion material used as the space layer between the first recording layer on the lining sheet and the second recording layer on the supporting substrate, thereby to laminate the lining sheet and the supporting substrate via the space layer.

39. The method of manufacturing an optical recording medium according to claim 22, wherein the thickness of the space layer is 5 to 30 µm.

40. The method of manufacturing an optical recording medium according to claim 22, wherein the thickness of the light transmitting layer is 30 to 150 µm.

* * * * *